United States Patent
Bosved et al.

(10) Patent No.: US 9,173,105 B2
(45) Date of Patent: Oct. 27, 2015

(54) METHOD OF PREVENTING FRAUDULENT USE OF A SECURITY MODULE

(71) Applicant: GIESECKE & DEVRIENT GMBH, Munich (DE)

(72) Inventors: Jan Bosved, Nacka (SE); Jorgen Hult, Tullinge (SE)

(73) Assignee: GIESECKE & DEVRIENT GMBH, Munich (DE)

( * ) Notice: Subject to any disclaimer, the term of this patent is extended or adjusted under 35 U.S.C. 154(b) by 0 days.

(21) Appl. No.: 14/356,966

(22) PCT Filed: Nov. 6, 2012

(86) PCT No.: PCT/EP2012/004611
§ 371 (c)(1),
(2) Date: May 8, 2014

(87) PCT Pub. No.: WO2013/068097
PCT Pub. Date: May 16, 2013

(65) Prior Publication Data
US 2014/0308926 A1  Oct. 16, 2014

(30) Foreign Application Priority Data
Nov. 8, 2011 (EP) ..................... 11008890

(51) Int. Cl.
*H04W 12/12* (2009.01)
*H04L 29/06* (2006.01)
*H04W 12/08* (2009.01)

(52) U.S. Cl.
CPC ............ *H04W 12/12* (2013.01); *H04L 63/0853* (2013.01); *H04L 63/101* (2013.01); *H04W 12/08* (2013.01)

(58) Field of Classification Search
CPC ................................ H04W 12/12; H04W 12/06
USPC ............................... 455/410, 411, 414.1, 558
See application file for complete search history.

(56) References Cited

U.S. PATENT DOCUMENTS 5,809,413 A * 9/1998 Meche et al. ................. 455/411
7,505,758 B2 3/2009 Choi
(Continued)

FOREIGN PATENT DOCUMENTS

CN 102026180 A 4/2011
EP 1562394 A2 8/2005
(Continued)

OTHER PUBLICATIONS

European Search Report from corresponding EP Application No. EP 11008890.3, Apr. 12, 2012.
(Continued)

*Primary Examiner* — Cong Tran
(74) *Attorney, Agent, or Firm* — Workman Nydegger

(57) ABSTRACT

A method includes preventing fraudulent use of a security module in a device, and the security module is designed to perform the following steps of: retrieving a device identifier of the device from the device; checking whether negative allowance information is stored in the security module for the retrieved device identifier and transmit a security module identifier of the security module and the retrieved device identifier to a server; and receiving a response from the server regarding whether the security module is allowed to operate with the identified device and store negative allowance information in the security module for the retrieved device identifier, if the security module is not allowed to operate with the identified device according to the server response. A security module may execute the method, and a system may include the device and the server.

11 Claims, 1 Drawing Sheet

(56) References Cited

U.S. PATENT DOCUMENTS

| | | |
|---|---|---|
| 7,929,959 B2 | 4/2011 | De Atley et al. |
| 8,355,699 B1 * | 1/2013 | Lo et al. .................. 455/411 |
| 8,428,570 B2 | 4/2013 | De Atley et al. |
| 2005/0170813 A1 | 8/2005 | Choi |
| 2006/0025177 A1 * | 2/2006 | Tu .................. 455/558 |
| 2007/0077925 A1 * | 4/2007 | Hiyama .................. 455/420 |
| 2009/0251318 A1 * | 10/2009 | Ho .................. 340/571 |
| 2010/0029247 A1 | 2/2010 | De Atley et al. |
| 2011/0195751 A1 | 8/2011 | Atley et al. |
| 2012/0009979 A1 | 1/2012 | Thill et al. |
| 2013/0260833 A1 | 10/2013 | De Atley et al. |
| 2015/0044999 A1 * | 2/2015 | Haberkorn .................. 455/411 |

FOREIGN PATENT DOCUMENTS

| | | |
|---|---|---|
| WO | 2009029156 A1 | 3/2009 |
| WO | 2010102954 A1 | 9/2010 |

OTHER PUBLICATIONS

International Search Report from corresponding PCT Application No. PCT/EP2012/004611, Feb. 28, 2013.

* cited by examiner

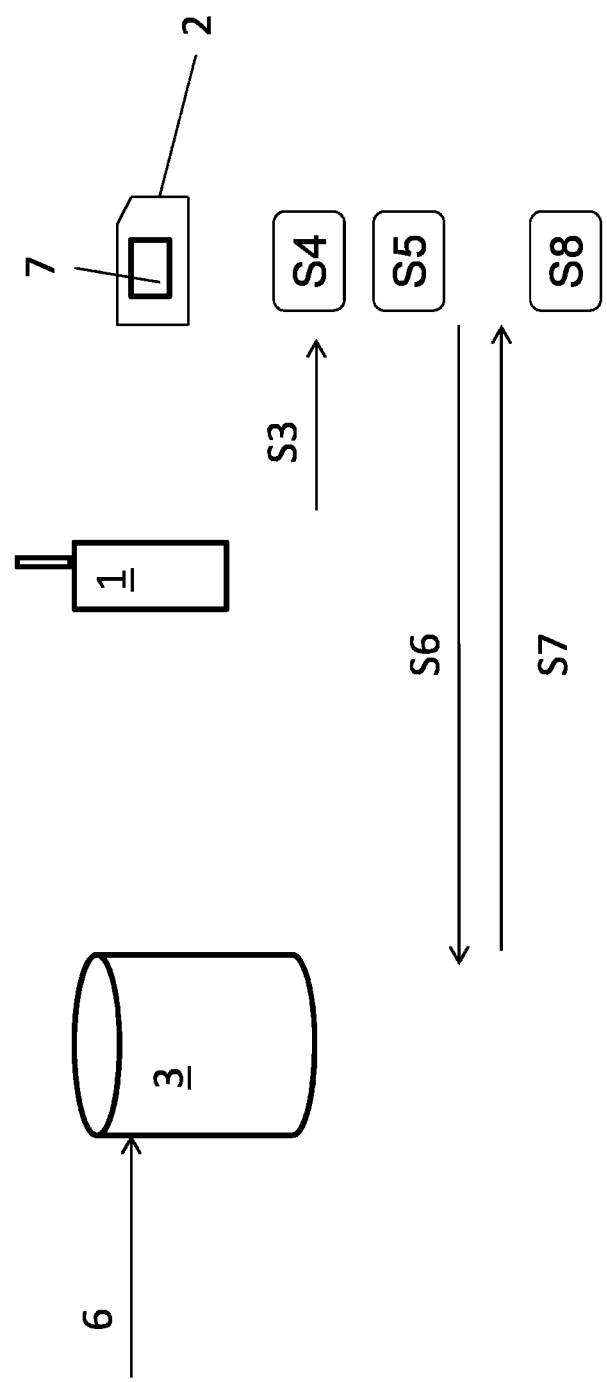

METHOD OF PREVENTING FRAUDULENT USE OF A SECURITY MODULE

BACKGROUND

The present invention refers to a method of preventing fraudulent use of a security module, such as a SIM card, and a device, such as a mobile device, and also to a security module.

SUMMARY

Mobile terminals using the Global System for Mobile communication (GSM) and $3^{rd}$ Generation Partnership Program (3GPP) specifications as standards for digital wireless communication are called GSM-3G phones, below called mobile device.

Normally a SIM (Subscriber Identity Module) card for a mobile device (ME) such as a mobile telephone can be used in any mobile device. Thus it is possible to steal a SIM card belonging to an owner and to use the SIM card in a mobile device of the thief. The result will be that the owner will be billed for services used with the SIM card. One problem is however that the thief must know the PIN code of the SIM card in order to be able to use the SIM card.

SIM cards residing in machines are not easily supervised and may be placed in environments that make supervision difficult. For example, SIM cards are placed in traffic light equipments, in alarm installations, in vehicles, boat motors, and other equipment that shall be remotely monitored.

Such SIM cards do not normally need a PIN code to make them operate. Therefore, such SIM cards may be stolen and used in a mobile device or another stationary device. Certainly the proprietor of the SIM card will be billed. The present invention is thus also applicable regarding stationary devices having a SIM card and operating over a mobile telephone communication network.

Another problem is that mobile devices (ME) may be stolen, where the thief may steal a more sophisticated mobile telephone and then use his or her SIM card in the stolen telephone.

So far the prevention of illegal use has focused on illegal use of mobile devices. For example, there is a standardized register, the EIR (Equipment Identity Register) where network operators may check if a device is stolen by looking up the IMEI (International Mobile Equipment Identifier) in the EIR. That is no longer sufficient.

The network operators certainly keep track of, and shut off, subscriptions reported stolen. This procedure is based on mobile users being missing their mobile telephone and reporting it stolen. However, subscriptions residing in millions of mobile devices will not be missed.

Once SIM cards are being distributed over millions of machines and devices there is a strong desire to make it possible to automatically monitor that the SIM cards, i.e. the subscriptions are not operated illegally in a device other than the intended ones.

Document WO 2009/029156 relates to a method of activating a mobile device for use with a certain service provider. The document describes a method where it is not necessary to lock the mobile device to a certain service provider. An activation server that is in connection with the service provider can issue an activation ticket that is transmitted to the mobile device in order to lock up the device for further communication depending on the identity of the SIM card.

In U.S. Pat. No. 5,809,413 the EIR locks the terminal to the SIM and the SIM to the terminal, if the IMEI of a terminal is listed as stolen. In EP 1 562 394 A2 the terminal generates a code value based on terminal and card numbers and blocks the terminal functions for listed code values. The terminal checks the list and the EIR checks if the terminal is stolen.

However, there is a strong desire for a method of preventing fraudulent use of a security module, such as a SIM card. This problem is solved by the subject matters of the independent claims. The dependent claims are directed to preferred embodiments of the invention.

A preferred solution refers to a method of preventing fraudulent use of a security module, such as a SIM (Subscriber Identity Module) card, and fraudulent use of a device using said security module, such as a mobile equipment (ME). The invention is characterized in that at the time a security module is issued or sold or at a later time the IMEI (International Mobile Equipment Identifier) of the device for which the security module is designated and at least one identifier of the security module, such as the ICCID (Integrated Circuit Card ID) of a SIM card and/or the IMSI (International Mobile Subscriber Identity) stored on a SIM card, are caused to be stored in a server to which the device can be connected, in that said server contains information on what identity of a security module is allowed to operate with what device identified by its IMEI, in that an application is stored in the security module, which application is designed to retrieve the IMEI of the device and designed to connect the security module to said server and transmit said identity of the security module and of the device to the server, in that the security module designed to receive a response from said server regarding whether the security module is allowed to operate with the identified device, in that at least when the device is turned on for the first time with a new security module said application asks the server whether the transmitted identity of the security module and the device is allowed to operate together or not, and in that in case the security module and said device are allowed to operate together the security module and the device are started for further communication.

BRIEF DESCRIPTION OF THE DRAWINGS

Below the present invention is described in more detail together with exemplifying embodiments and in connection with a drawing, where FIG. 1 shows a schematic block diagram.

DETAILED DESCRIPTION OF VARIOUS EMBODIMENTS

Even if the present invention is exemplified below with a "mobile device" the invention also relates to stationary devices having a security module, such as a SIM card, as exemplified below.

Further, the present invention is exemplified below in connection with a SIM card, but it shall be understood that the present invention is not restricted to SIM cards, but any security module. The security module is preferably a hardware security module. The security module may be a portable data carrier and hence reversibly removable from the device. Examples for such portable data carriers are SIM card for mobile or stationary communication, a secure multimedia card or USB Token. Still further the security module may be built-in in the device (as a fixture), such as a TPM (Trusted Platform Module) or a secure NFC (Near Field Communication) module.

Thus, the present invention refers to a method of preventing fraudulent use of a security module, such as a SIM (Subscriber Identity Module) card, and fraudulent use of a device using said security module, such as a mobile equipment (ME) as well as a security module to be used with the method.

According to the invention, at the time a security module 2 is issued or sold or at a later time the IMEI (International Mobile Equipment Identifier) of the device 1 for which the security module 2 is designated and at least one identifier of the security module, such as the ICCID (Integrated Circuit Card ID) of a SIM card and/or the IMSI (International Mobile Subscriber Identity) stored on a SIM card, is caused to be stored in a server 3 to which the device 1 can be connected. Alternatively to storing predetermined identifiers, rules may be stored on the server which pairs of identifiers are allowable to operate together.

The mobile device can thereafter be connected to the server, as illustrated with the arrows S6, S7 in FIG. 1. For example said identifiers can be fed into the server by personnel in a store where the security module is purchased, as illustrated by arrow 6 in FIG. 1.

Said server 3 contains information on what identity of a security module 2 is allowed to operate with what device 1 identified by its device identifier (IMEI).

Further, an application 7 is stored in the security module 2, which application is designed to retrieve the IMEI of the device 1 and designed to connect the security module 2 to said server 3 and transmit said identity of the security module 2 and of the device 1 to the server 3. The security module 2 is designed to receive a response from said server 3 regarding whether the security module 2 is allowed to operate with the identified device 1.

A security module being allowed to operate with the device enables at least one function required for the device. A security module being not allowed to operate with the device disables at least one function required for the device. Preferably the function of the security module is required for authenticating the device (and/or the user of the device) in the network.

Still further, at least when the device 1 is turned on for the first time with the (new) security module 2 said application 7 asks the server 3 whether the transmitted identifiers of the security module and the device are allowed to operate together or not. In case the security module 2 and said device 1 are allowed to operate together the security module and the device are started for further communication, i.e. are allowed to use the mobile network.

According to one exemplifying embodiment of the invention the flow in case a mobile device 1 with a stolen SIM card 2 is switched on is described below.

1. The mobile device 1 connects to the mobile network.
2. When the power is switched on there is an event in the mobile device triggering the application 7 on the SIM card 2.
3. The application 7 reads S3 the IMEI of the mobile device (ME).
4. The application 7 checks S4 if there is a forbidden device flag set in a memory of the SIM card 2 for the read IMEI. There is no forbidden flag for the read IMEI.
5. The application 7 compares S5 the read IMEI with allowed IMEI's on a list in the memory of the SIM card 2, if there are any. The IMEI is not on such list.
6. The application 7 sends S6 a request to said server 3 regarding the IMEI.
7. The server 3 responds S7 to the application 7 that the ME with the read IMEI is forbidden.
8. The application 7 sets a forbidden flag for the read IMEI in the memory of the SIM card 2.
9. At next power on the said event triggers the application 7, the application 7 will detect the forbidden flag (in step S4) and will prevent the mobile device 1 from connecting to the mobile network.
10. The application 7 re-sets the forbidden flag.

It should be considered that step 1 of connecting to the mobile network is preferably performed as a step 4a (after step S4). In particular this step will be performed only, if the forbidden flag is not set for this IMEI.

According to said exemplifying embodiment of the invention the flow in case a mobile device 1 with an allowed SIM card 2 is switched on for the first time is described below.

1. The mobile device 1 connects to the mobile network.
2. When the power is switched on there is an event in the mobile device 1 triggering the application 7 on the SIM card
3. The application 7 reads S3 the IMEI of the mobile device (ME).
4. The application 7 checks S4 if there is a forbidden device flag set in a memory of the SIM card 2 for the read IMEI. There is no forbidden flag for the read IMEI.
5. The application 7 compares S5 the read IMEI with allowed IMEI's on a list in the memory of the SIM card, if there are any. The IMEI is not on such list.
6. The application 7 sends a request S6 to said server 3 regarding the IMEI.
7. The server 3 responds S7 to the application 7 that the ME with the read IMEI is allowed.
8. The application saves S8 the IMEI on a list in the memory of the SIM card 2.
9. The application 7 opens the mobile device 1 for further communication.

According to said exemplifying embodiment of the invention the flow in case a mobile device 1 with an allowed SIM card 2 is switched on again is described below.

1. The mobile device 1 connects to the mobile network.
2. When the power is switched on there is an event in the mobile device 1 triggering the application 7 on the SIM card 2.
3. The application 7 reads S3 the IMEI of the mobile device (ME).
4. The application 7 checks S4 if there is a forbidden device flag set in a memory of the SIM card 2 for the read IMEI. There is no forbidden flag for the read IMEI.
5. The application 7 compares S5 the read IMEI with allowed IMEI's on a list in the memory of the SIM card 2, if there are any. The IMEI is on such list.
9. The application 7 opens the mobile device for further communication.

According to a preferred embodiment the identifier of the security module 2 and the identifier of the device 1 are caused to be coupled to each other to form a pair of numbers and caused to be stored in said server 3 to which the device 1 can be connected. Said application 7 is designed to connect the security module 2 to said server 3 and transmit said pair to the server and designed to receive a response from said server 3 regarding if said pair is stored in said server, at least when the device 1 is turned on for the first time with a new security module 2. In case the said pair is stored on said server 3 the security module and the device are started for further communication.

According to a preferred embodiment, as described above, of the present invention in case said identifiers are stored on said server 3 as being allowed together, said pair is stored as allowed in a memory of the security module 2. When the device 1 is turned on the next time said application 7 on the security module 2 is caused to check said identifiers against said memory of the security module 2. In case the said identifiers are stored as allowed in the memory of the security module, the security module and the device are started for further communication.

According to another preferred embodiment, as described above, in case said identifiers are not stored on said server 3, said identifiers are stored as being not allowed in the memory of the security module 2. When the device 1 is turned on the next time said application 7 on the security module 2 is caused to check said pair against said memory of the security module 2. In case the said identifiers are stored as being not allowed in the memory of the security module, the security module and the device are not started for further communication.

According to still another preferred embodiment, as described above, in case the application 7 on the security module 2 has denied the device 1 further communication, the application 7 is arranged to delete the identifiers that are not allowed from a memory of the security module 2.

This enables a dynamic approach. A device (ME) that is forbidden at a certain time might be allowed at a later time. As the SIM card 2 application 7 makes a check each time the device is powered on, a forbidden device can be changed to an allowed device for the SIM card 2 in question.

According to still another preferred embodiment of the invention the number of said allowed combination of identifiers which may be stored in the memory of said security module 2 may be two or more.

This allows an owner of several mobile telephones (ME) to be able to use all of them, one at a time.

As indicated before said identifiers can also be defined by rules in said server 3. For example, security modules with numbers starting with XXXX are allowed in devices with numbers starting with AAAA, BBBB and CCCC but are not allowed in devices with numbers starting with AAAD. Such rules may define a group of devices, such as traffic lights or burglar alarm installations. Certainly it is up to the man skilled in the art to design appropriate rules.

Further, the identifiers can be stored in the memory of the security module 2 only temporarily. Temporarily can mean either for a certain duration of time, such as an hour or a day, and/or for a number of accesses, e.g. implemented as a counter. Temporarily stored identifiers can be provided by the server 3 as well as start values of the corresponding counter or counters.

A mobile operator can deploy a system and a method to ensure that SIM cards 2 are not used illegally, because the mobile equipment (ME) must belong to a partner of the network operator who is actually paying for the communication with the mobile device.

As is apparent from the above said the application 7 on the SIM card 2 prevents together with the server 3 the use of a subscription in a forbidden device.

The server 3 keeps track of what combination of a SIM card and a mobile device (ME) is allowed for use. Thus, the forbidden device need not be a stolen device registered with an EIR. The mobile operator may dynamically decide what devices are forbidden at a certain point of time for any subscription.

Further, the application 7 need not communicate with the server 3 if the mobile equipment (ME) is registered as allowed in the memory of the SIM card 2.

It is apparent that the present invention solves the problem described above.

Above several embodiments of the present invention have been described. However, the present invention shall not be regarded as restricted to the various embodiments, but can be varied within the scope of the claims.

The invention claimed is:

1. A method of preventing fraudulent use of a security module in a device, the method being automatically performed by the security module, the method comprising:
   retrieving a device identifier of the device from the device;
   checking whether negative allowance information is stored in the security module for the retrieved device identifier;
   checking whether positive allowance information is stored in the security module for the retrieved device identifier;
   when neither negative allowance information nor positive allowance information are stored in the security module for the retrieved device identifier, transmitting a security module identifier of the security module and said retrieved device identifier to a server, wherein said server contains information on what security module identity is allowed to operate with what device identity;
   receiving a response from said server regarding whether the security module is allowed to operate with the identified device; and
   storing negative allowance information in the security module for the retrieved device identifier, if the security module is not allowed to operate with the identified device according to the server response.

2. Method according to claim 1, wherein the security module deletes the stored negative allowance information when a predetermined criteria is reached.

3. Method according to claim 2, wherein the predetermined criteria is reached when a reset counter reaches a given value.

4. Method according to claim 2, wherein the predetermined criteria is a time criteria.

5. Method according to claim 2, wherein the security module deletes the negative allowance information when it has been used once in the step of checking.

6. Method according to claim 1, wherein the security module disables at least one of its functions when it stores negative allowance information for the retrieved device identifier.

7. Method according to claim 1, wherein, in case said identifiers are allowed together, said device identifier is stored as allowed in a memory of the security module.

8. Method according to claim 6, wherein the security module enables the at least one of its functions when it stores positive allowance information for the retrieved device identifier.

9. Method according to claim 1, wherein the number of said device identifiers stored as or stored with positive and/or negative allowance information stored in the memory of said security module may be two or more.

10. Method according to claim 1, wherein the device identifier is an IMEI (International Mobile Equipment Identifier) and/or the security module identifier is an ICCID (Integrated Circuit Card ID) and/or the IMSI (International Mobile Subscriber Identity).

11. A system comprising a security module according to claim 10 arranged in a device and the server, which contains the information on what security module identity is allowed to operate with what device identity.

* * * * *